Figure 1:
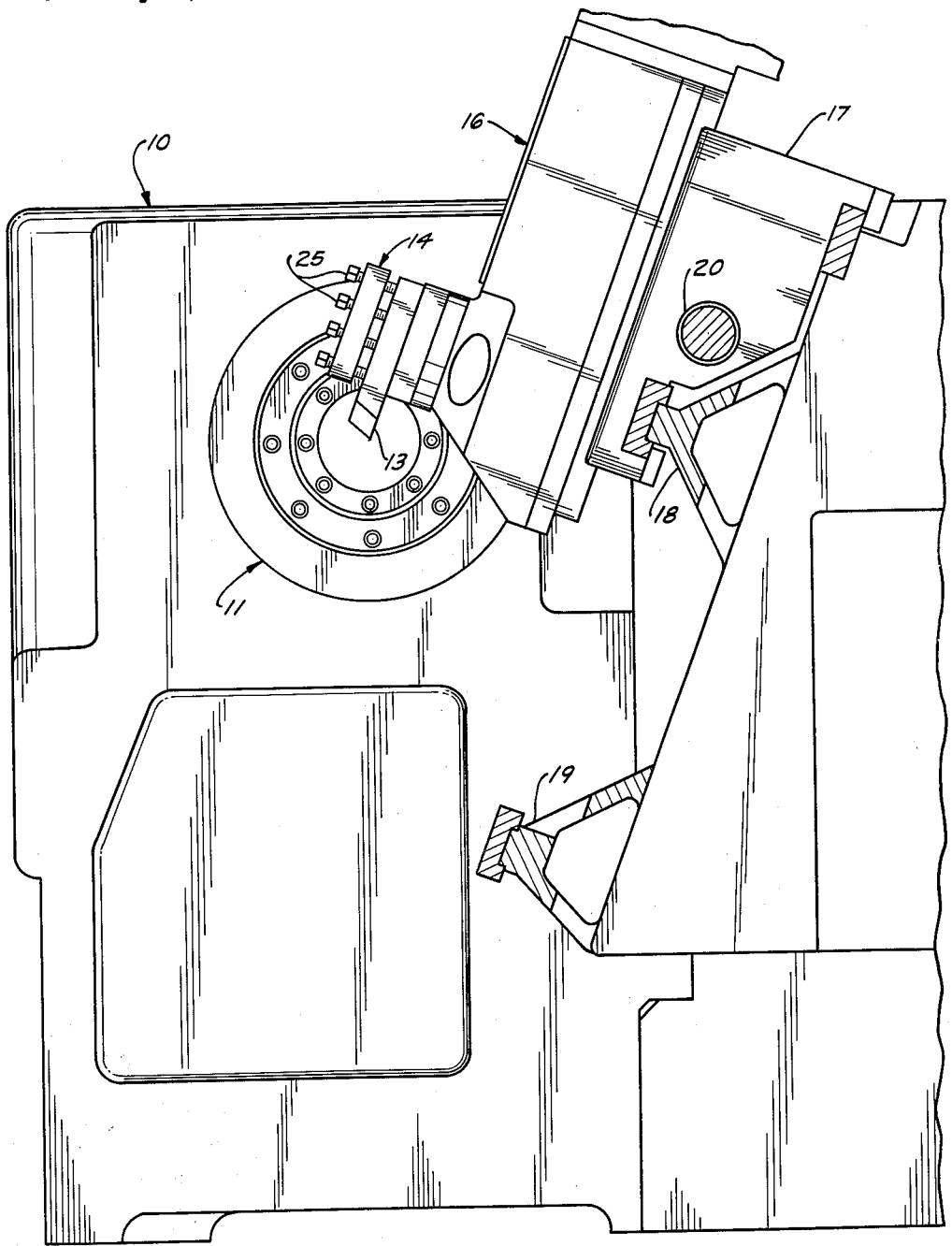

April 18, 1961 N. P. DARASH 2,979,971
POWER INDEXED MACHINE TOOL TURRET
Filed May 27, 1960 5 Sheets-Sheet 1

INVENTOR.
NICHOLAS P. DARASH
BY Hudson, Boughton,
Williams, David & Hoffmann
ATTORNEYS.

April 18, 1961 N. P. DARASH 2,979,971
POWER INDEXED MACHINE TOOL TURRET
Filed May 27, 1960 5 Sheets-Sheet 3

INVENTOR.
NICHOLAS P. DARASH
BY Hudson, Boughton,
Williams, David & Hoffmann
ATTORNEYS April 18, 1961     N. P. DARASH     2,979,971
POWER INDEXED MACHINE TOOL TURRET
Filed May 27, 1960     5 Sheets-Sheet 4

INVENTOR.
NICHOLAS P. DARASH
BY Hudson Boughton,
Williams, David & Hoffmann
ATTORNEYS April 18, 1961 N. P. DARASH 2,979,971
POWER INDEXED MACHINE TOOL TURRET
Filed May 27, 1960 5 Sheets-Sheet 5
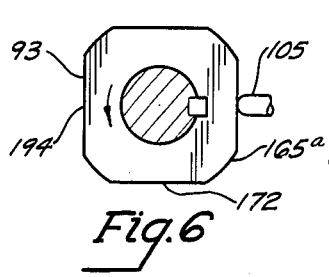
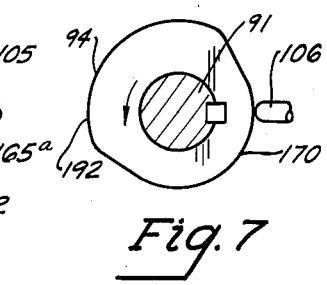
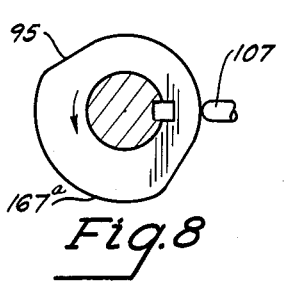
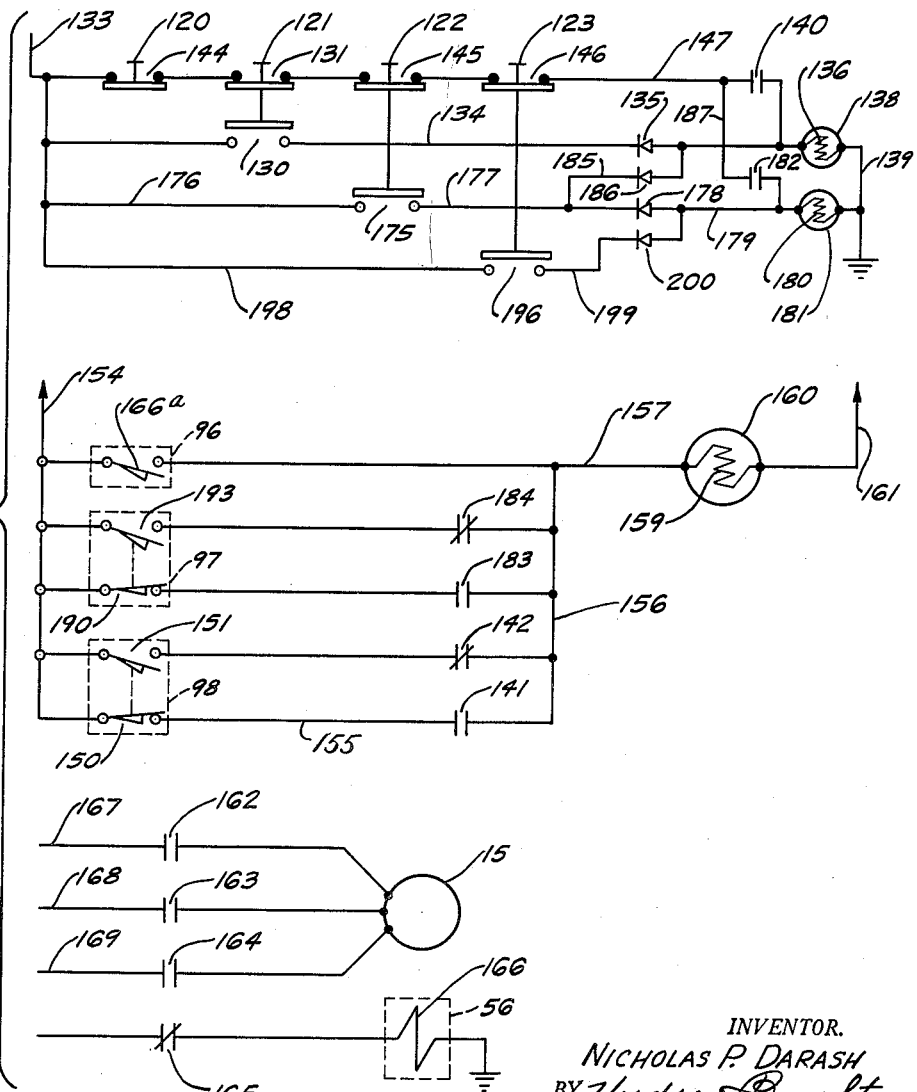
INVENTOR.
NICHOLAS P. DARASH
BY Hudson Boughton,
Williams, David & Hoffman
ATTORNEYS.

United States Patent Office 2,979,971
Patented Apr. 18, 1961

2,979,971

POWER INDEXED MACHINE TOOL TURRET

Nicholas P. Darash, Euclid, Ohio, assignor to The Warner & Swasey Company, Cleveland, Ohio, a corporation of Ohio Filed May 27, 1960, Ser. No. 32,389

12 Claims. (Cl. 74—820)

This invention relates to power operated machine tool turrets for use on lathes or the like and which are of the type having a rotatable turret member which can be moved or indexed by motor means into a number of positions for selectively bringing each of a number of tools held thereby into operative relation with respect to a workpiece.

It is an object of this invention to provide a new and improved motor operated tool holder of the above mentioned character which may be mounted on a machine tool carriage or on the cross slide of a lathe or other machine tool and in which the rotatable turret member can be automatically rotated or indexed to a new position in response to manually operated control switches or previously prepared program data recorded in the form of magnetic tape, punched tape, punched cards, or other program control means.

Another object of the present invention is the provision of a multi-position machine tool turret assembly of the above mentioned character which comprises releasable locking means operable in timed relation with a first Geneva wheel means for rotating the turret to a new index position, and a second Geneva wheel means rotated in timed relation to the first Geneva wheel means and serving to actuate switch means to which the operating motor is responsive for determining the position into which the turret will be rotated and locked.

Still another object of this invention is the provision of a rotatable turret which is adapted to be releasably secured in any one of a plurality of angular indexed positions through the use of meshing teeth couplings means, such as, for instance, a coupling similar to one known commercially as the Curvic coupling, the turret being adapted to be moved axially for separating and releasing the coupling means by cam means forming part of a Geneva type mechanism for rotating the turret in a step-by-step manner to the selected indexed positions, and which turret is adapted to be clamped in its indexed positions by a pair of clamping rings having co-operating tooth-like wedge elements, the rings being relatively rotatable or oscillatable in timed relation to operation of the Geneva means to release the turret for axial movement by the cam means and to clamp the turret in a selected indexed position.

As another object this invention aims to provide a dependable and accurately indexing power operated machine tool turret which is simple of construction and positive in its action, and which has a minimum of moving parts and will provide a maximum of flexibility in use.

Figure 2:
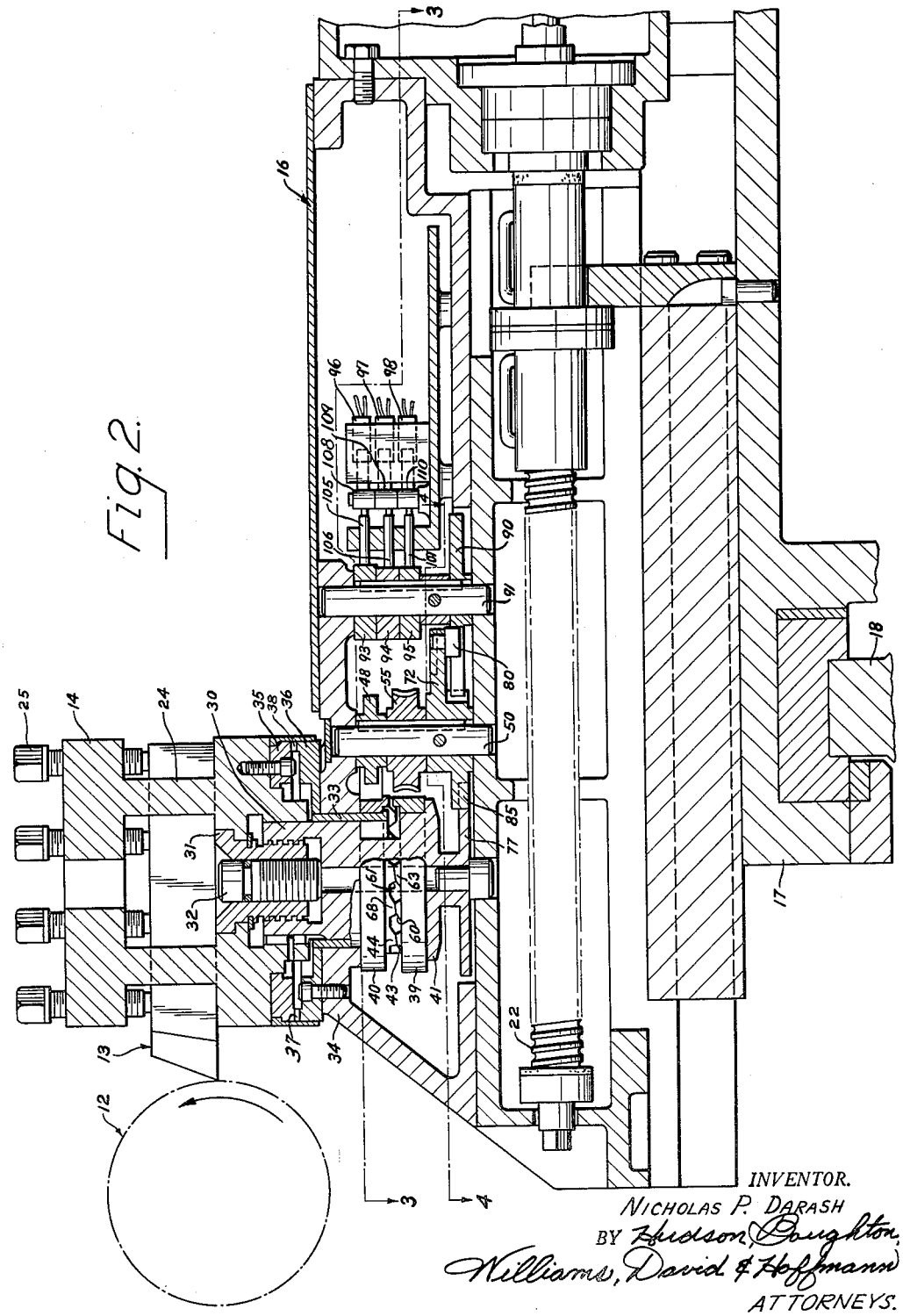
Figure 3:
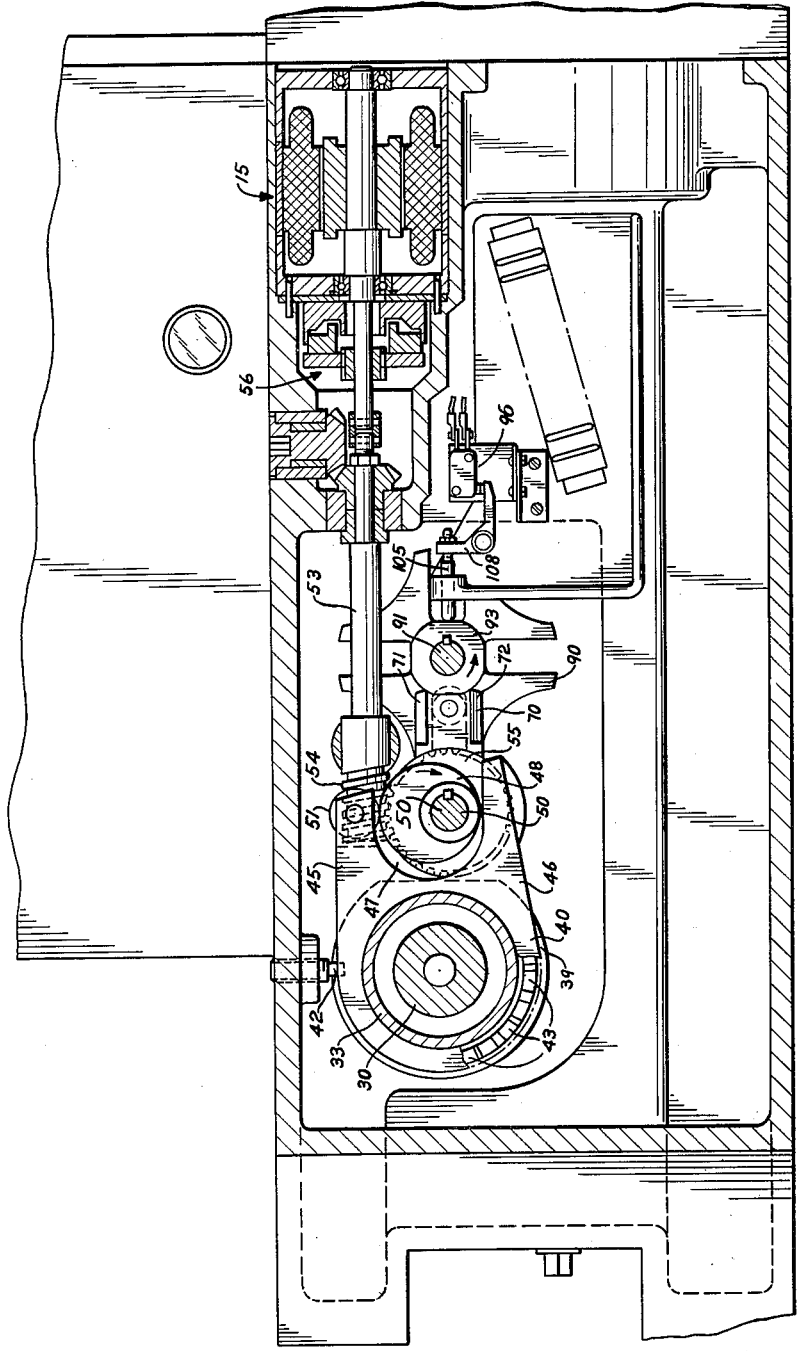
Figure 4:
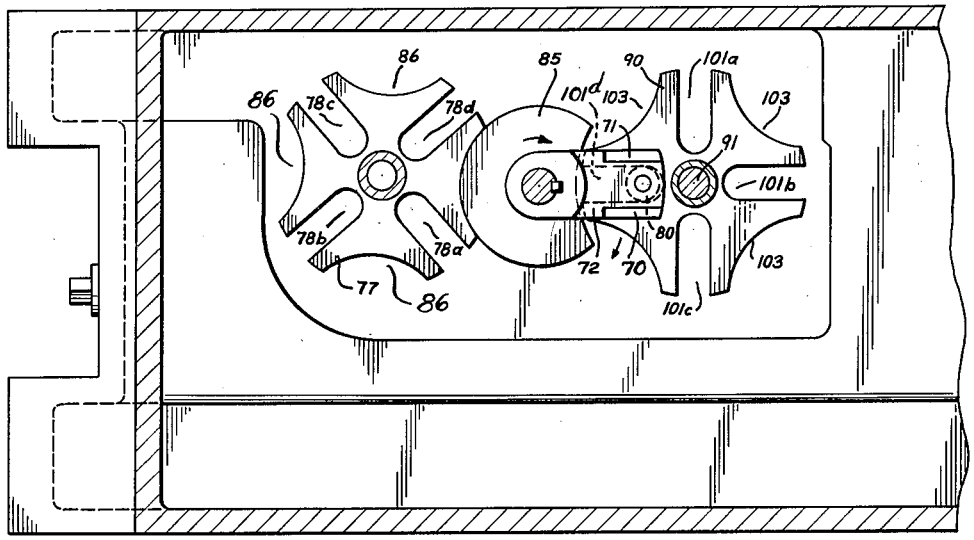
Figure 5:
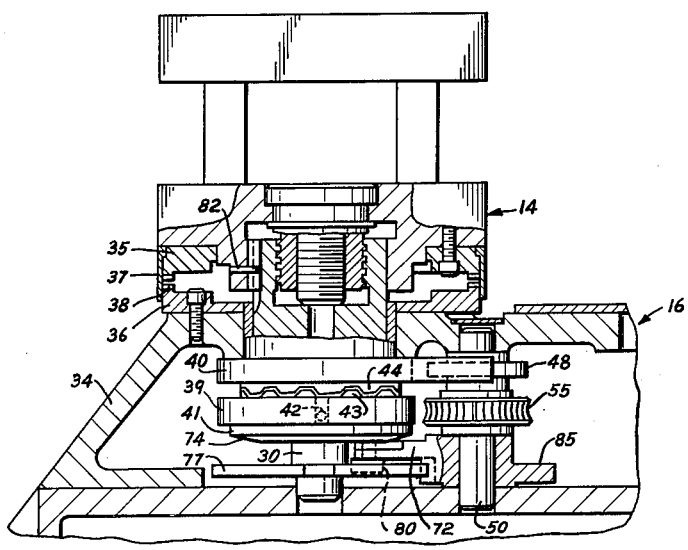

Other objects and advantages will become apparent from the following detailed description of a preferred embodiment of the invention, and from the accompanying sheets of drawings forming a part of this specification, and in which:

Fig. 1 is a fragmentary view of a portion of a turret type lathe with a power operated turret embodying this invention mounted on the cross slide thereof, Fig. 2 is an enlarged sectional view of the cross slide and turret of Fig. 1, Fig. 3 is a sectional view taken substantially along line 3—3 of Fig. 2, Fig. 4 is a sectional view taken substantially along line 4—4 of Fig. 2, Fig. 5 is a sectional view of the turret similar to Fig. 2 but showing the turret in its raised position, Fig. 6 is a plan view of a position determining cam, Fig. 7 is a plan view of another position determining cam, Fig. 8 is a view of still another positioning determining cam, and Fig. 9 is a schematic diagram of the position control circuit.

Although the invention may be embodied in power indexed turrets for use in other machine tools and having other numbers of cutting tools and corresponding index positions, the invention is herein described and illustrated with reference to a turret assembly for use in a machine tool or lathe having a headstock 10 with spindle or chuck means 11 for rotating a workpiece 12 with respect to any one of four cutting tools, such as 13, which are supported in a four position or square turret indicated generally at 14 and which is mounted on a cross slide 16 for rotation by a turret drive motor 15 with respect to the cross slide.

The cross slide 16 is mounted in a conventional manner for movement with a carriage 17 along ways 18 and 119 in a direction parallel to the axis of rotation of the workpiece 12 by a feed screw 20. The cross slide 16 is adapted to be moved transversely to the axis of rotation of the workpiece 12 by a feed screw 22 mounted in the cross slide and driven by a motor (not shown) in a conventional manner.

The turret 14 has four faces equally spaced thereabout in which are provided suitable grooves 24 for receiving the four tools 13, which tools are secured therein, as by set-screws 25, so as to extend therefrom in four directions. The turret 14 is adapted to be indexed or rotated about its central axis into four angular positions for selectively presenting each of the tools 13 to the workpiece 12 through the agency of driving and locking mechanisms as will be described hereafter.

The turret 14 is supported for its rotational and axial movement with respect to the cross slide 16 by a central post member 30 which is adjustably secured to the turret by a threaded member 31 and a locking screw 32 and which post member is rotatably and slidably supported in a suitable bushing 33 fixed in a housing 34 of the cross slide.

Meshing teeth coupling means are provided between the turret 14 and the cross slide 16 to releasably secure the turret in each of the four mentioned positions, and comprise a ring 35 secured to the turret 14 and a ring 36 secured to the cross slide housing 34, the rings having circular patterns of complementary teeth 37, 38 respectively, as shown in Figure 5. The teeth 37 and 38 are adapted to come into meshing engagement as in Fig. 2 when the turret is moved axially toward the cross slide 16, and to be separated or disengaged as illustrated in Fig. 5 when moved axially away from the cross slide.

A pair of cooperating clamping rings 39, 40 are adapted to draw down the turret 14 for locking thereof, and to free the turret for axial movement to disengage the teeth 37, 38 of the coupling means. The ring 39 is mounted on the turret post 30 in surrounding relation thereto and bears against a flange 41 which is conveniently formed as part of the turret posts. The ring 39 is held against rotation with respect to the turret post and with respect to the housing 34 by a screw pin 42 fixed in the housing and engaging in a slot in the ring 39.

The ring 39 is provided with a series of axially extending tooth-like wedge elements 43 projecting toward the ring 40. The latter, ring 40, is rotatably carried in abutting relation to the housing 34 by the bushing 33 and the ring 40 is provided with a series of wedge elements 44 extending toward the ring 39.

The ring 40 has a pair of arms 45, 46 extending to one side thereof, which arms define a slot 47 and embrace a cam or eccentric element 48. The eccentric element 48 is secured to a rotatable shaft 50 for rotation therewith and bears against a roller 51 carried by the arm 45.

The shaft 50 is suitably journalled in the housing 34 and is adapted to be rotated by the turret drive motor 15 through a drive comprising a shaft 53, a worm 54, and a worm wheel 55 when the motor is energized and a magnetic brake 56 is released. Figs. 2 and 3 are illustrative of the positions of the above elements when the turret is in a locked or clamped condition. Rotation of the shaft 50 in a clockwise direction, and the eccentric element 48 therewith, through approximately 180° will cause the eccentric element 48 to move the arm 46 and the ring 40 in a clockwise direction as viewed in Fig. 3. This rotation is sufficient to move the wedge elements 43 and 44 out of alignment with one another to permit axial movement of the turret 14 as illustrated in Fig. 5 under the influence of cam means later described in detail.

Continued rotation of the shaft 50, and the eccentric element 48 therewith, through another 180° will cause the eccentric-element to gear against the roller 51 and to rotate the clamping ring 40 with respect to the ring 39 in a counterclockwise direction. The wedge elements 43, 44 have steeply sloping side surfaces 60, 61 and have end or axially facing surfaces 62, 63 exhibiting relatively small slope. The counterclockwise rotation of the ring 40 will cause the surfaces 60, 61 of the wedge elements to force the ring 39, post 30 and turret 14 downwardly until the sloping surfaces 62, 63 are in engagement. It will be recognized that further rotation of the ring 40 will result in the surfaces 62, 63 wedging the rings 39, 40 apart thereby tightly meshing the teeth 37, 38 of the coupling means and firmly clamping the turret 14 against axial or rotational movement.

In order to raise the turret 14 to its Fig. 5 position, that is with the teeth 37, 38 of the coupling means disengaged to allow rotation thereof, there is provided cam means in the form of cam surfaces 70 and 71 provided on a Geneva wheel actuating arm 72 which is secured for rotation with the shaft 50. The cam surfaces 70 and 71 are adapted to cooperate with a beveled surface 74 provided on the under side of the flange 41 which has been described as being formed as a part of the turret supporting post 30. The Geneva arm 72 rotates together with the cam or eccentric 48 and, as the latter moves the clamping ring 40 in a sense to release the turret for axial movement, the cam surface 70 engages the beveled surface 74 of the flange 41 forcing the latter to ride up the cam surface, thereby raising the turret 14 and freeing it for rotation.

A Geneva wheel 77 is provided on the turret supporting post 30 and is driven to effect rotation of the turret. The Geneva wheel 77, best illustrated in Fig. 4, is of a conventional form having four radially extended slots 78a, 78b, 78c and 78d. The just mentioned slots are adapted to be engaged by a roller 80 carried by the Geneva arm 72 as it rotates with the shaft 50 into the dotted line position shown in Fig. 5. As the roller 80 is about to engage the slot 78a, the turret 14 is raised and freed for rotation by the cooperation of the cam surface 70 and the flange 41, and further rotation of the arm 72 will cause the roller 80 to drive the Geneva wheel 77 one quarter of a revolution bringing the slot 78a to the position formerly occupied by the slot 78d.

The quarter revolution of the Geneva wheel 77 effects a similar rotation of the turret 14 which is secured for rotation with its supporting post 30 by a suitable key or pin 82, thereby bringing the turret into a new index position and a new tool 13 into operative relation with respect to the workpiece 12.

As the Geneva arm 72 continues its rotation and the roller 80 leaves the slot 78a, the flange 41 will ride down the cam surface 71 at the same time as the teeth 44 of the clamping ring 40 is forcing the ring 39 downwardly thereby lowering the turret 14 and bringing the teeth 37, 38 of the coupling means into meshing engagement for preventing the turret from being displaced from its new index position. A locking sector 85 is provided for rotation with the Geneva arm 72 and is conveniently formed integrally therewith. The locking sector 85 is adapted to engage in arcuate depressions 86 between each of the slots 78a, 78b, 78c and 78d, as the roller 80 leaves each of these slots and serves to prevent rotation of the Geneva wheel except when driven by the arm 72 and roller 80. It will be recognized that as the arm 72 returns to its Fig. 4 position, the clamping cam or eccentric 48 will bear against the roller 51 to move the clamping ring 40, which cooperates with the clamping ring 39 in the manner previously described, to firmly clamp the turret 14 in its new index position.

A second Geneva wheel 90 is secured to a shaft 91 for rotation thereof and thereby serves to drive a plurality of turret position determining cams 93, 94 and 95. These cams are adapted to actuate limit switches 96, 97, and 98 respectively, which form part of a representative control circuit, more fully described hereafter, and which permits the preselection of the positions to which the turret is to be rotated.

The Geneva wheel 90 is similar to the wheel 77 and is provided with four drive slots 101a, 101b, 101c, and 101d and intermediate arcuate depressions 103 for receiving the locking segment or sector 85.

When the Geneva arm 72 rotates from its Fig. 4 position in the manner previously described, the roller 80 will drive the Geneva wheel 90 in a counterclockwise direction until the roller leaves the slot 101d and the locking sector 85 engages the adjacent arcuate depression 103. Such rotation of the Geneva wheel 90 is transmitted through the shaft 91 to the cams 93, 94, and 95 which bear against plungers or cam followers 105, 106, and 107 which in turn bear against bell crank levers 108, 109, and 110 for actuation of the switches 96, 97, and 98.

The switch actuating cams 93, 94, and 95 have profiles illustrated in Figs. 6, 7, and 8 respectively, and which profiles are so positioned and related that the switches 96, 97, and 98 are operated in a sequence or pattern to which the drive motor 15 and the magnetic brake 56 are responsive to position the turret 14 in its preselected angular positions. It will be recognized that the Geneva wheels 77 and 90 will be rotated by the Geneva wheel arm 72 in timed relation to one another thereby relating the condition of the switches 96, 97, and 98 to the position occupied by the turret at any given time.

Two of the cams, namely cams 94 and 95, and their associated switches, represent a binary indicating or sensing means for conditioning the control circuit of Fig. 9 uniquely for each of the four faces of the turret as they are presented toward the workpiece 12.

These cams each have four positions corresponding to the four turret faces, and are each provided with a profile such that in two positions of each cam the associated switch is actuated and in two other positions the associated switch is not actuated. The cam 94 is angularly displaced 90° from the cam 95 and therefore it will be evident that the switches 97 and 98 may be at once both actuated, both not actuated, one actuated and the other not, or the reverse. The two switches thereby provide four conditions of actuation representing the four positions or faces of the turret 14.

The cam 93 has such a profile that the switch 96 is not actuated in any of the four faces or index positions of the turret, but is actuated for positions of the turret between those index positions and the purpose of this cam and switch will become evident as the description proceeds.

The control circuit includes four turret face selecting switches 120, 121, 122, and 123 which are illustrated as being of the push-button variety, however it will be recognized that other circuits and other forms of control switches may be used in conjunction with the cams 93, 94, and 95 and their associated switches 96, 97, and 98 which are disclosed herein. Also, the turret mechanism may be controlled or indexed by circuit means wherein the circuits are completed by means other than the manual operation of switches, for example punched tape, magnetic tape, punched cards, pattern controlled means, or other programming systems.

The cams 93, 94, and 95 are illustrated in Figs. 6, 7, and 8 respectively in the positions which they occupy when face one and a tool 13 of the turret 14 are in a position presented to the workpiece 12. Assuming the turret 14 to be in such a position, and if it is desired to rotate it to its position wherein the second face thereof is presented to the workpiece, the face two push button 121 is depressed. Depression of the push button 121 serves to close the normally open contactors 130 thereof and to open the normally closed contacts 131 thereof. The contacts 130 and 131 are of the overlapping type and thereby their contacts 130 are closed before the contacts 131 are opened. Closing of the contacts 130 completes a circuit which may be traced from an A.C. line 133 through the now closed contacts 130, a conductor 134, a rectifier 135, an actuating solenoid 136 to a face position relay 138, and a conductor 139 to ground. This circuit energizes the relay 138 closing the normally open contacts 140, 141 thereof and opening the normally closed contacts 142 thereof.

As the push button switch 121 is then released, the overlapping type contacts 131 close before the contacts 130 open, and therefore a holding circuit is completed from the conductor 133 through normally closed contacts 144 of the push button switch 120, the now closed contacts 131, normally closed contacts 145 of push button switch 122, normally closed contacts 146 of the push button switch 123, a conductor 147, the now closed contacts 140 of relay 138, coil 136, and conductor 139 to ground.

It will be observed that with the cams 93, 94, and 95 in their illustrated positions, the switches 96, 97, and 98, respectively controlled thereby, are each in their normal or unoperated condition as is illustrated in Fig. 9. The switch 98 has normally closed contacts 150 and normally open contacts 151 and, the closing of contacts 141 of the face relay 138 upon operation of the push button switch 121 as described above, will effect a circuit which may be traced from a conductor 154 through the contacts 150, a conductor 155, the now closed contacts 141, conductors 156 and 157 through the actuating solenoid 159 of a motor control relay 160 to a conductor 161. Actuation thereby of the motor relay 160, causes the normally open contacts 162, 163, and 164 thereof and opens the normally closed contacts 165 thereof.

The now closed contacts 162, 163, and 164 connect the three phase turret drive motor 15 to power lines 167, 168, and 169 for energization in a sense to rotate the shaft 50 and the Geneva arm 72 in a clockwise direction as viewed in Fig. 3 and explained heretofore. The opening of the normally closed contacts 165 de-energizes the actuating coil 166 of the magnetic brake 56 to permit such rotation.

As the shaft 50 rotates, and the Geneva arm 71 therewith, the Geneva wheel 90 will be rotated in a counter-clockwise direction carrying with it the shaft 91 and the cams 93, 94, and 95. The Geneva wheel 90 and the just mentioned cams will be seen to rotate from their Fig. 3 positions an angular distance of 45°, at which time the locking sector 85 will engage in an arcuate depression 103 holding the Geneva wheel 90 in that position as the Geneva arm proceeds to unlock and raise the turret 14 for rotation with the Geneva wheel 77.

As the cams 93, 94, and 95 rotate with the shaft 91 the angular distance of 45° from their illustrated positions and in the direction indicated by the arrows thereon, the plunger 105 will be moved by one of four lobes 165a of the cam 93 actuating the switch 96 and closing the normally open contacts 166a thereof, while the plunger 107 is beginning to be moved by a lobe 167a of the cam 95. The plunger 106 rides on the heel portion 170 of the cam 94 and switch 97 is not at this time actuated.

As the Geneva arm 72 continues rotating it moves the Geneva wheel 77 to index the turret to its newly selected face two position in which it is securely locked or clamped, in the manner previously described, as the Geneva arm 72 leaves the Geneva wheel 77. The Geneva arm then engages the next slot 101a of the Geneva wheel 90 rotating it another 45° bringing the slot 101a to the position formerly occupied by the slot 101d. The second 45° rotation of the Geneva wheel 90, and the cams 93, 94, and 95 therewith, causes the plunger 107 to ride onto the lobe 167a of the cam 95 thereby actuating the switch 98 opening the contacts 150 thereof and closing its contacts 151.

The contacts 166a, which are already closed by the cam 93, maintain energization of the motor relay 160 from conductor 154 through the contacts 166a, conductor 157 and the actuating solenoid 159. The turret drive motor 15 therefore continues rotating the shaft 50 and the Geneva actuating arm 72, although the contacts 150 have opened, until the second 45° rotation is completed and the plunger 105 rides onto the flat 172 of the cam 93.

The switch 96 is thereby released from actuation opening the contacts 166a and thereby de-energizing the motor relay 160, and consequently the turret drive motor 15, and energizing the magnetic brake 56 to prevent coasting of the motor and of the mechanisms driven thereby. It will be recognized that, with the turret now in its face two position, the switch 97 remains unactuated becaues the plunger 106 thereof is still on the heel 170 of the cam 94, and the switch 98 remains actuated because the plunger 107 is engaged by the lobe 167a of the cam 95.

If it is now desired to index the turret 14 to its face three position, the face three push button switch 122 is depressed closing the contacts 175 thereof and opening the contacts 145 thereof. Because the contacts 145 and 175 are of the overlapping type, the contacts 175 close before the contacts 145 open. Upon closing of the contacts 175 a circuit is established which may be traced from the power line 133 through a conductor 176, contacts 175, a conductor 177, a rectifier 178, a conductor 179 and the actuating solenoid 180 of a face position relay 181 to ground. Energization of the solenoid 180 actuates the relay 181 closing the normally open contacts 182 and 183 thereof and opening the normally closed contacts 184 thereof. The closing of the contacts 175 also establishes a circuit for maintaining energization of the face position relay 138 through a conductor 185 and a rectifier 186 thereby keeping the contacts 140 and 141 closed and the contacts 142 open.

As the push button switch 122 is released the contacts 145 thereof close before the contacts 175 thereof open and a holding circuit for the relay 181 is established from the line 133 through the contacts 144, 131, 145, 146, conductors 147 and 187, and the now closed contacts 182 and the solenoid 180 of that relay. Likewise, the holding circuit previously described for the relay 138 and including contacts 140 is again effective to keep that relay energized. It will be recognized that both relays 138 and 180 are therefore placed in an energized condition by the depression of the face three control switch 122.

The closing of the contacts 183 completes a circuit which may be traced from the line 154 through contacts 190 of the switch 97, the now closed contacts 183, conductors 156 and 157, and the actuating solenoid 159 of the motor control relay 160 to the line 161. The completion of this circuit once again energizes the motor 15 rotating the shaft 50 and the Geneva arm 72 to rotate the Geneva wheel 90 another 45°. The cams 93, 94, and 95 are thereby rotated actuating the switch 166a to assure continuous rotation or energization of the motor 15 as the Geneva arm 72 proceeds to index the turret 14 into its face three position through actuation of the Geneva wheel 77 in the manner previously described.

As the Geneva arm 72 continues its rotation, it engages the slot 101b of the Geneva wheel 90 advancing it and the cams 93, 94, and 95 an additional 45°. The plunger 107 will remain on the lobe of the cam 95 holding the switch 98 in its actuated condition, and the plunger 106 will ride up on the lobe 192 of the cam 94 thereby moving the switch 97 into it actuated position opening the contacts 190 thereof and closing the contacts 193 thereof. At the same time the plunger 105 will ride down on the flat 194 of the cam 93 opening the contacts 166a of the switch 96 de-energizing the motor relay 160 and the motor 15 and setting the magnetic brake 56. The turret is therefore secured in its face three index position.

If it is now desired to index the turret 14 to its face four position, the push button control switch 123 is depressed closing the normally open contacts 196 thereof and opening the normally closed contacts 146 thereof. Opening of the contacts 146 serves to break the holding circuit existing through the contacts 140 and 182 for keeping the relays 138 and 131 energized. The contacts 146 and 196 are of the overlapping type, however, and the closing of the contacts 196 completes a circuit for energizing the relay 181, which circuit may be traced from the line 133 through a conductor 198, the contacts 196, a conductor 199, a rectifier 200, the conductor 179 and the actuating solenoid 180 to ground, before the holding circuit through the contacts 182 is broken by the opening of contacts 146. Only the relay 138 is therefore de-energized and, as the switch 123 is released, the contacts 146 thereof close before the contacts 196 thereof open, thereby re-establishing the holding circuit for relay 181 through the still closed contacts 182 thereof.

Upon the de-energization of the relay 138, the normally open contacts 183 thereof open, and the normally closed contacts 184 close. The closing of the contacts 184 completes a circuit which may be traced from the line 154 through the now closed contacts 193 of the switch 97, the contacts 184, the conductor 157 and the actuating solenoid 159 of the motor control relay 160 to the line 161. The motor relay 160 is thereby actuated energizing the motor 15 to rotate the Geneva arm 72 through its previously described operating cycle, beginning by rotating the cams 93, 94, and 95 another 45° and indexing the turret 14 into its face four position.

As the Geneva arm completes its cycle it rotates the cams 93, 94, and 95 another 45° releasing the switch 98 from its actuating condition, maintaining the switch 97 in actuating condition, and opening the contacts 166a of the switch 96 to de-energize the relay 160 thereby halting the motor 15 and setting the brake 56. The turret 14 is now indexed in its face four position and ready for another face selection.

If it is now desired to return the turret into its initial or face one position, the push button control switch 120 may be depressed, opening the contacts 144 thereof and breaking the holding circuit existing through the contacts 182 of the relay 181, thereby releasing that relay from actuation. The contacts 184 of the relay 181 are thereby returned to their normally closed condition and the contacts 183 are returned to their open condition.

Closing of the contacts 184 completes a circuit which may be traced from the line 154 through the now closed contacts 193, the contacts 184, the conductor 157 and the actuating solenoid 159 of the motor control relay 160 to the line 161. The brake 56 is thereby once again de-energized and the motor 15 is energized for rotating the Geneva actuating arm 72 through its operating cycle which is completed by bringing the cams 93, 94, and 95 into their initial positions as illustrated in Figs. 6, 7, and 8. The switches 96 and 97 are thereby released from their actuated condition and the opening of the contacts 166a releases the motor relay 160 from actuation, de-energizing the motor 15 and setting the brake 56 with the turret now indexed in its face one position.

It will be appreciated that in the embodiment described in which the turret has four angular positions, the shaft 91 and the cams 93, 94, and 95 rotate a 90° increment (in two 45° steps) of a full revolution for each full revolution of the Geneva drive arm 72, and that each revolution of the arm 72 effects rotation of the turret one index position. Thus, the number of increments of a revolution which the shaft 91 and the cams thereon must complete to make a full revolution is equal to a first multiple of the number of angular or index positions of the turret. It will also be appreciated that the indicating means may comprise cams having other profiles such that the number of increments of angular movement thereof which would be required to make a full revolution thereof would be equal to other multiples of the number of angular positions of the turret.

In practice the above described circuit would advantageously be protected against short circuiting or the like, such as might occur if more than one of the push button control switches are depressed simultaneously, by suitable interlocking means. These, however, are well known to those skilled in the art to which the invention pertains and need not be described here.

From the foregoing detailed description of an automatically indexing turret mechanism embodying this invention, it will be apparent that there has been provided by the invention a particularly simple, rugged and smoothly acting turret indexing arrangement which is responsive to circuit means for selecting a desired turret position into which the turret is automatically rotated and locked, and which arrangement is peculiarly adapted for use with circuitry including either manual control switches or programming means such as punch cards, punch tape, magnetic tape or the like.

Although the invention has been described in considerable detail and with reference to a specific embodiment thereof, it will be understood that the invention is not limited thereby but rather the invention includes all such adaptations, changes and modifications as are embraced by the scope of the claims hereof.

Having described my invention, I claim:

1. In a machine tool turret assembly of the character described, a base; a turret mounted on said base for rotative movement about an axis into a number of angular positions with respect to said base; said turret being movable axially toward and away from said base; a rotatable drive member mounted on said base; a drive motor operatively connected to said drive member for rotation thereof; intermittent motion drive means interconnecting said drive member and said turret to rotate said turret to its next angular position for each revolution of said drive member; clamping means connecting said turret and said base and adapted to releasably clamp said turret against axial movement thereof away from said base; means interconnecting said clamping means and said drive member to release and clamp said turret upon each revolution of said drive member; rotatable turret position indicating means; drive means connecting said drive member to drive said indicating means an angular increment for each revolution of said drive member; the number of said increments required for a full revolution of said indicating means being equal to a multiple of said number of angular positions of said turret; circuit means responsive to the rotation of said indicating means to be uniquely conditioned thereby for each of said number of angular positions of said turret; said circuit means including position control means for selecting any one of said number of angular positions and energizing said drive motor for effecting rotation of said turret toward a selected position until said circuit is uniquely conditioned by said indicator means for said selected position.

2. In a machine tool turret assembly of the character described, a base; support means mounting said turret on said base for rotative movement about its axis into a plurality of angular positions with respect to said base; said turret being movable axially with respect to said base between a seated position on said base and a raised position; cam means rotatably mounted on said base and adapted to engage and move said support means and to thereby move said turret axially away from said base; intermittent motion drive means for rotating said turret; said cam means and drive means being interconnected for rotation of said turret in timed relation to the raising thereof; clamping means for releasably clamping said turret against said axial movement when in its seated position; said clamping means including a first ring having spaced axially facing wedge elements thereon and mounted for axial movement with said turret; a second ring having spaced wedge elements thereon and mounted on said base coaxially with said first ring; abutment means on said base for limiting axial movement of said second ring away from said first ring; and actuating means for oscillating one of said rings with respect to the other ring between a position where the wedge elements on the one ring are aligned with the spaces between the wedge elements on the other ring to release said turret for raising and another position where the wedge elements on one ring are in aligned relation with the wedge elements on the other ring to clamp said turret in said seated position; said clamping ring actuating means being interconnected with said drive means so as to release said turret for raising in timed relation to said rotation of said turret.

3. A machine tool turret assembly as defined in claim 2 and wherein said wedge elements comprise first and second surfaces having different slopes; said wedge elements of said first and second rings adapted to cooperate with their respective first surfaces in contact for assuring said axial movement of said turret toward said base for engaging said locking means, and said wedge elements of said first and second rings adapted to cooperate with their respective second surfaces in contact to effect said clamping of said turret.

4. A machine tool turret assembly as defined in claim 3 and wherein said intermittent motion drive means comprises a Geneva motion mechanism.

5. In a machine tool turret assembly of the character described, a base; support means mounting said turret on said base for rotative movement about its axis into a plurality of angular positions with respect to said base; said turret being movable axially with respect to said base; cooperable locking means on said turret and said base for releasably locking said turret against rotation out of said positions; cam means rotatably mounted on said base and adapted to engage and move said support means and to thereby move said turret axially away from said base for disengaging said locking means and releasing said turret for rotation; intermittent motion drive means for rotating said turret; said drive means being connected for actuation in timed relation to unlocking of said turret by said cam means; clamping means for releasably clamping said turret against said axial movement; said clamping means including a first ring having wedge elements thereon and mounted for axial movement with said turret, a second ring having wedge elements thereon and mounted on said base coaxially with said first ring, and actuating means for oscillating one of said rings with respect to the other ring whereby said wedge elements cooperate to releasably clamp said turret with said locking means in engagement a drive motor connected with said cam means, said drive means and said actuating means for operation thereof in timed relation so as to effect unclamping, unlocking, rotation, locking and clamping of said turret in sequence; circuit means to which said motor is responsive for rotating said turret into selected angular positions; said circuit including switch means for conditioning said circuit in accordance with the angular positions of said turret; and switch actuating means connected for operation of said switches in timed relation to operation of said drive means.

6. A machine tool turret assembly as defined in claim 5 and wherein said intermittent motion drive means comprises a Geneva motion mechanism.

7. A machine tool turret assembly as defined in claim 6 and wherein said switch actuating means comprises a second Geneva motion mechanism.

8. In a machine tool turret assembly for selectively presenting one of a plurality of tools to a workpiece, a turret mounted on a base for rotative movement with respect thereto; a first Geneva wheel means connected to said turret for step-by-step rotation thereof; a second Geneva wheel means adapted to actuate switch means; Geneva drive arm means for rotating said first and second Geneva wheel means in timed relation to one another; an electric circuit including said switch means, and an electric drive motor means in said circuit operatively connected with said drive arm means to rotate the latter and responsive to said switch means to be energized for effecting rotation of said turret to a predetermined index position.

9. In a machine tool turret assembly of the character described, a turret mounted on a base for rotative movement into a plurality of angular positions with respect thereto; cooperable locking means on said turret and base for releasably locking said turret in each of said positions; a first Geneva wheel means connected to said turret for rotation thereof; a second Geneva wheel means on said base and adapted to actuate limit switch means; a Geneva drive arm means for operating said first and second Geneva wheel means in timed relation; motor drive means connected for rotation of said arm means and responsive to said limit switch means for rotating said turret into predetermined ones of said positions; and cam means movable with said arm means and adapted to actuate said locking means for releasing and locking said turret in timed relation to rotation thereof by said first Geneva wheel means.

10. A machine tool turret comprising a turret mounted for rotational movement with respect to a base, meshing teeth coupling means on said turret and base for holding said turret in a plurality of operative angular positions; said turret being axially movable toward and away from said base for respectively engaging and disengaging the teeth of said coupling means, a first Geneva wheel connected to said turret for rotation thereof into said angular positions; a second Geneva wheel mounted on said base and connected to first cam means for actuation of limit switch means; a Geneva drive arm adapted to rotate said first and second Geneva wheels in a step-by-step manner; an electrical circuit including said switch means, an electric drive motor in said circuit and operatively connected with said drive arm to rotate the latter and responsive to said limit switch means to be energized for effecting movement of said turret into said positions; and second cam means movable with said arm and adapted to move said turret axially thereof for disengagement of said coupling means to allow rotation of said turret.

11. A machine tool turret comprising a turret mounted for rotational movement with respect to a base, meshing teeth coupling means on said turret and base and engageable for holding said turret in a plurality of operative angular positions; said turret being axially movable toward and away from said base for respectively engaging and disengaging the teeth of said coupling means; a Geneva wheel connected to said turret for rotation thereof into said angular positions; clamping means for releasably holding said turret against axial movement and with said coupling means in engagement; a Geneva drive arm adapted to rotate said Geneva wheel in a step-by-step manner, first cam means rotatable with said Geneva wheel and effective to actuate said clamping means between positions for holding and releasing said turret; second cam means movable with said arm and adapted to move said turret axially for disengagement of said coupling means for rotation of said turret.

12. In a machine tool turret assembly of the character described, a turret mounted on a base for rotative movement into four angular positions with respect thereto; cooperable clamping means on said turret and base for releasably clamping said turret in each of said positions; a first Geneva wheel means connected to said turret for rotation thereof; a second Geneva wheel means on said base and adapted to actuate first and second switch means; said first and second switch means having four combinations of actuation corresponding to said four positions of said turret; Geneva drive arm means for operating said first and second Geneva wheel means in timed relation; motor drive means connected for rotation of said arm means and responsive to said switch means for rotating said turret into predetermined ones of said positions; and cam means rotatable with said arm means; said clamping means comprising relatively rotatable and axially aligned clamping rings having cooperating wedge elements; one of said clamping rings being oscillated by rotation of said cam means to effect releasing and clamping of said turret in timed relation to rotation thereof by said first Geneva wheel means.

References Cited in the file of this patent

UNITED STATES PATENTS 157,722     Paine _____ Dec. 15, 1874